United States Patent
Faerber et al.

(10) Patent No.: US 6,944,453 B2
(45) Date of Patent: Sep. 13, 2005

(54) METHOD FOR CONTROLLING AN INTERSYSTEM LINK TRANSFER

(75) Inventors: Michael Faerber, Wolfratshausen (DE); Kenneth Isaacs, Dorset (GB); David Wynne Thomas, GB-Hampshire (GB); Jean-Michel Traynard, München (DE)

(73) Assignee: Siemens Aktiengesellschaft, Munich (DE)

( * ) Notice: Subject to any disclaimer, the term of this patent is extended or adjusted under 35 U.S.C. 154(b) by 473 days.

(21) Appl. No.: 10/220,860

(22) PCT Filed: Mar. 6, 2001

(86) PCT No.: PCT/EP01/02508
§ 371 (c)(1),
(2), (4) Date: Oct. 22, 2002

(87) PCT Pub. No.: WO01/67795
PCT Pub. Date: Sep. 13, 2001

(65) Prior Publication Data
US 2003/0153313 A1 Aug. 14, 2003

(30) Foreign Application Priority Data
Mar. 6, 2000 (EP) ............................................. 00301815

(51) Int. Cl.⁷ ................................................ H04Q 7/20
(52) U.S. Cl. ...................................... 455/436; 370/335
(58) Field of Search ................................. 455/436, 443; 370/335

(56) References Cited

U.S. PATENT DOCUMENTS

| | | | | |
|---|---|---|---|---|
| 5,878,349 A | | 3/1999 | Dufour et al. .............. 455/438 |
| 5,978,679 A | * | 11/1999 | Agre .......................... 455/442 |
| 6,377,804 B1 | * | 4/2002 | Lintulampi ............... 455/435.2 |
| 6,850,540 B1 | * | 2/2005 | Peisa et al. ................. 370/468 |
| 2001/0022782 A1 | * | 9/2001 | Steudle ....................... 370/335 |
| 2001/0043576 A1 | * | 11/2001 | Terry .......................... 370/328 |
| 2002/0085531 A1 | * | 7/2002 | Hermann et al. ........... 370/338 |
| 2002/0136181 A1 | * | 9/2002 | Belaiche et al. ............ 370/337 |

FOREIGN PATENT DOCUMENTS

WO 98/59513 12/1998

OTHER PUBLICATIONS

3rd Generation Partnership Project; Technical Specification Group Radio Access network; Multiplexing and channel coding (TDD) 3G TS 25.212 version 3.1.0, Dec. 1999.
3rd Generation Partnership Project; Technical Specification Group Radio Access network; Multiplexing and channel coding (FDD) 3G TS 25.222, version 3.1.0, Dec. 1999.
Universal Mobile Telecommunications System (UMTS); RRC Protocol Specification (3G TS 25.331 version 3.1.0 (ETSI TS 125 331 v3.1.0), Jan. 2000.

* cited by examiner

Primary Examiner—Joseph Mancuso
Assistant Examiner—Ariel Balaoing
(74) Attorney, Agent, or Firm—Staas & Halsey LLP

(57) ABSTRACT

According to the invention, a reduced set of transport format combinations is signalled to a subscriber station which has established a link to a second radio communication system in a second signalling channel of said second radio communication system. The transport format indicator is then selected from the reduced set of transport format combinations and used to initiate a link transfer to the first signalling channel of a first radio communication system. A full set of transport format combinations is subsequently signalled to the subscriber station in the first signalling channel.

7 Claims, 1 Drawing Sheet

METHOD FOR CONTROLLING AN INTERSYSTEM LINK TRANSFER

CROSS REFERENCE TO RELATED APPLICATIONS

This application is based on and hereby claims priority to European Application No. 00301815.7 filed on Mar. 6, 2000, the contents of which are hereby incorporated by reference.

BACKGROUND OF THE INVENTION

1. Field of the Invention

The invention relates to a method for the control of an intersystem handover, in particular the handover between a GSM- and a UMTS mobile radio system.

2. Description of the Related Art

Reference is made to the UMTS standardization documents 3GPP: 3G TS 25.212 V3.1.1, 1999-12, Multiplexing and channel coding (FDD), 3GPP: 3G TS 25.222 V3.1.1, 1999-12, Multiplexing and channel coding (TDD), and 3GPP: 3G TS 25.331 V3.1.0, 2000-01, RRC Protocol Specification as the state of the art for the UMTS mobile radio system. For descriptions of the mobile radio system of the second generation GSM, the book by J. Biala, "Mobile Radio and Intelligent Networks", Vieweg Verlag, is taken as a basis for the general state of the art.

In radio communication systems, for example the European mobile radio system of the second generation GSM (Global System for Mobile Communications), information such as speech, image information or other data are transmitted by electromagnetic waves over a radio interface. At the radio interface, one or more connections are set up between a base station and plural subscriber stations; the subscriber stations can be, for example, mobile stations or stationary radio stations. The radiation of the electromagnetic waves takes place at carrier frequencies which are situated in a frequency band provided for the respective system. For future radio communication systems, for example, the UMTS (Universal Mobile Telecommunication System) or other systems of the third generation, frequencies in the frequency band of about 2,000 MHz are provided. For the third mobile radio generation UMTS, two modes are provided, one mode being termed a FDD (Frequency Division Duplex) operation and the other mode being termed a TDD operation (Time Division Duplex) operation. These modes find their application in different frequency bands; both modes support a so-called CDMA (Code Division Multiple Access) subscriber separation method.

Based on a parallel existence and a desired harmonization between the radio communication systems of the second and third generation, subscriber stations which have set up a connection in a radio communication system are to be given the possibility of handing the connection over to a further radio communication system, which as the case may be supports another transmission mode. Such an intersystem handover assumes, besides a synchronization of the subscriber station with the radio communication system which is to take over the connection, the knowledge of the transport format used. Here, according to the referenced state of the art of base stations of the UMTS mobile radio system, a subscriber station signals, during a connection setup, a so-called set of transport format combinations TFCS (Transport Format Combination Set). With a change of the transport format used at the time, a so-called Transport Format Combination Identifier TFCI is subsequently signaled to the subscriber station, and states which transport format is used out of the set of possible transport format combinations.

The signaling of the set of transport format combinations TFCS would have a length of up to 200 8-bit bytes, depending on the number of possible TFCIs in a known GSM signaling channel. This length is very disadvantageous because of the only limited capacity available on the usable GSM signal channels.

SUMMARY OF THE INVENTION

The invention has as its object to propose a method or respectively a communication system station which makes possible a small loading of the signaling channel of at least one of the systems during the signaling of an intersystem handover.

According to the invention, the set of transport format combinations is reduced, and in the reduced form is used for transmission to a subscriber station on a signaling channel, for example, a GSM mobile radio system. In order to be able to work with data of the reduced data set, the subscriber stations and corresponding network stations suitable for this method have a memory region with corresponding data.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
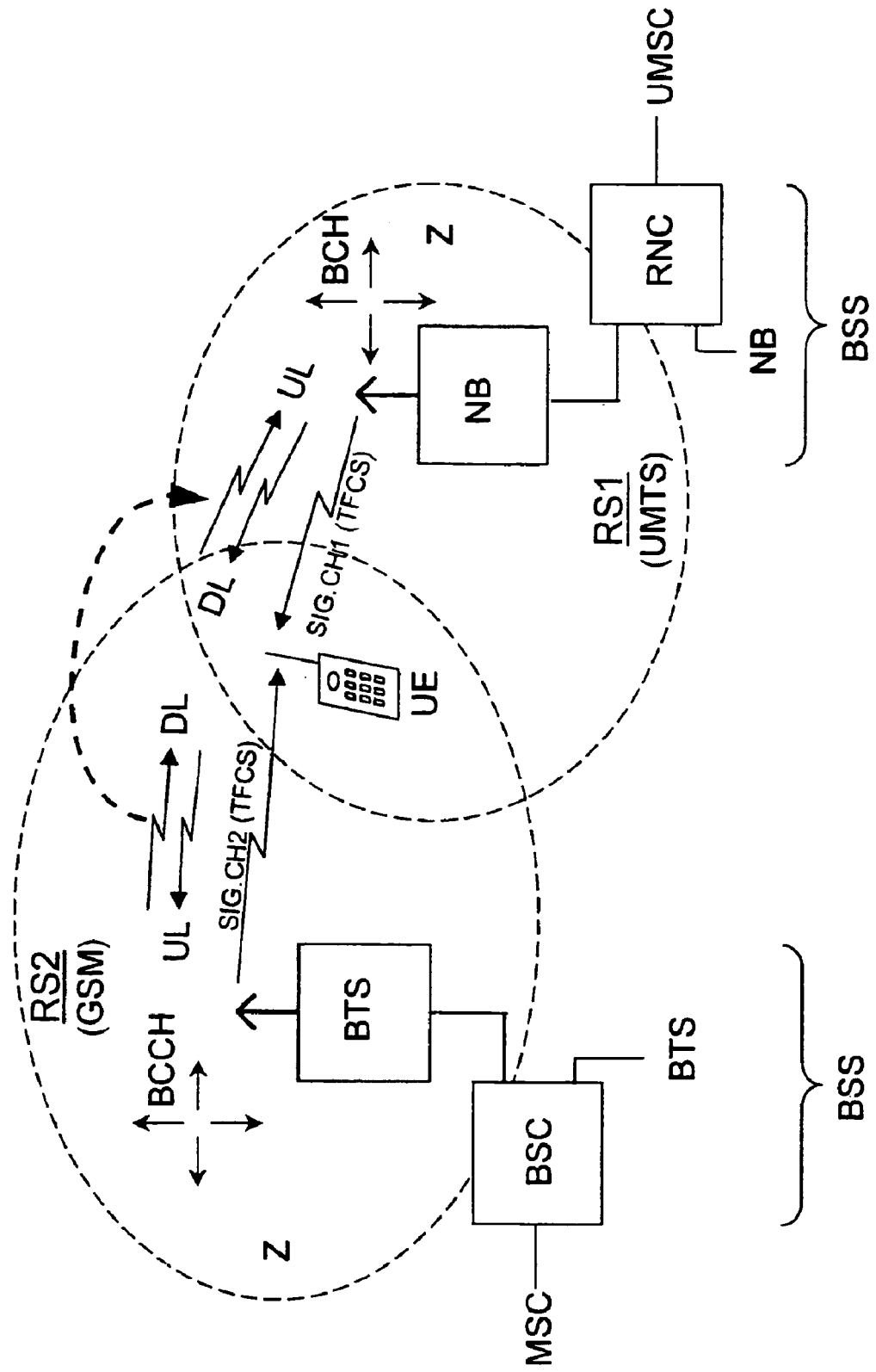
FIG. 1 is a block circuit diagram of two neighboring radio communication systems, a subscriber station being situated in their overlapping radio cells.

Reference will now be made in detail to the preferred embodiments of the present invention, examples of which are illustrated in the accompanying drawings, wherein like reference numerals refer to like elements throughout.

According to the invention, two exemplary cases of a handover can be distinguished for a subscriber station in the region of two radio systems. It is assumed below that the handover is from a GSM to a UMTS mobile radio system, the implementation in the reverse direction also being possible in principle.

According to a first case, during a connection setup procedure in a GSM mode, a service is requested by the subscriber station which cannot be made available by the GSM system or by a GSM transmission channel (so-called bearer). In this case, the necessity exists for a service-based connection handover from the GSM- to the UMTS mobile radio system.

In this phase, only a first signaling channel SDCCH (Stand-Alone Dedicated Control Channel) is set up as an independent, fixedly allocatable control channel. The transmission capacity of the SDCCH however appears insufficient for the transmission of the whole of the TFCS information, which in the present example can amount to up to 200 8-bit bytes. In this phase, however, no service is set up. The problem is therefore solved according to the invention in that the handover is limited to a signaling channel. in the simplest form of the method, for example, only a transport format indicator TFCI is used for the handover to the UMTS system over the GSM signaling channel GSM-SDCCH. Here an a priori knowledge of the transport format indicator TFCI to be used must be present.

After a successful handover to a UMTS signaling channel, the negotiation over the service to be used can be concluded within the UMTS system, the transport format indicator TFCI being signaled to the subscriber station from the then completely available set of transport format combinations TFCS for the traffic channel within a so-called UMTS radio bearer configuration information.

In order to make greater flexibility possible, a set of UMTS signaling channels can be defined. This enables access to the network by reduced signaling on these signaling channels. In an exemplary set of 32 TFCI, the reduced signaling can be transmitted, for example, by a simple bitmap coding of 5 bits within a signaling channel SDCCH.

In a second exemplary case, a stabilized connection to the GSM mobile radio system already exists, and the setup of a further service is requested which can only be made available by the UMTS system. The standardization of the UMTS system at the present time, Release 99, assumes solely the possibility of setting up a switched service (CS—Circuit Switched). Nevertheless this leads to an enlarged possibility of combination.

If it is assumed, as described, that the detailed TFCI or TFCS processing takes place within the UMTS system, then at least a combination of a signaling channel and a CS service is possible.

The advantage of the present state of the art according to Release 99 is that a handover of transmission channels with plural services and different qualities of service can be ignored on a GSM transmission channel; the concept of signaling by reduced data sets or counting of indicators can be expanded in the same manner to such procedures. Because of this, a complete flexibility in the TFCI coding within the signaling phase can be dispensed with.

If for example 64 to 128 combination possibilities are assumed between a required CS transmission channel and a signaling channel, the TFCI coding can be reduced to this required volume. The selection is limited to a predefined list of possible TFCI, which represent the respectively possible combinations, instead of to the complete set of possible TFCI. A coding of the combination possibilities can take place, as in the case first considered, by a bitmap coding of, for example, 7 bits.

Summarizing, the concept embraces a substitution of the complete TFCS signaling by a reduced set of combinations, which is known in both the subscriber station and the network. The reduced signaling makes possible a first handover to a UMTS signaling and data channel, or to a UMTS signaling channel, which is subsequently used for passing on the connection setup or service setup, making use of the then completely available flexibility of the TFCI coding.

FIG. 1 shows, as a version of the first embodiment of the embodiment example, respective sections of two mobile radio systems RS1, RS2 as an example of radio communication systems, e.g., a GSM and a UMTS mobile radio system. A mobile radio system typically has numerous mobile switching centers MSC or UMSC (Mobile Switching Center or UMTS Mobile Switching Center), which belong to a switching network SSS (Switching SubSystem) and are networked together or produce the access to a fixed network, and of respectively one or more base station systems BSS (Base Station Subsystem) connected to these mobile switching centers MSC, UMSC. A base station system BSS furthermore has at least one BSC (Base Station Controller) or RNC (Radio Network Controller) device for the allocation of radio-technical resources, and also at least one base station BTS (Base Transceiver Station) or NB (node B), respectively connected thereto.

A base station BTS, NB can set up, over a radio interface, connections to subscriber stations UE (User Equipment), such as for example mobile stations or other mobile and stationary terminal devices. At least one radio cell is formed by each base station BTS, NB. The size of the radio cell is as a rule determined by the range of a general signaling channel BCH (Beacon Channel) or BCCH (Broadcast Control Channel), which is transmitted from the base stations BTS, NB at a respectively higher transmitting power than that of the traffic channels. With sectorization or with hierarchical cell structures, even plural radio cells can be provided for per base station BTS, NB. The functionality of this structure can be transferred to other radio communication systems in which the invention can be used, in particular for subscriber access networks with wireless subscriber connection.

The example of FIG. 1 shows a subscriber station UE, which is embodied as a mobile station and which is situated in a coverage area, and also a first mobile radio system RS1 which supports a UMTS standard, and in addition a second mobile radio system RS2, which supports a GSM standard. The subscriber station UE has set up a connection to the base station BTS, shown by way of example, of the second mobile radio system RS2.

During the connection, the subscriber station UE periodically evaluates the transmission conditions of the radio interface to the base stations surrounding it, such as for example the indicated base station NB of the first mobile radio system RS1, in order, for example with a worsening of the transmission quality to the base station BTS of the second mobile radio system RS2, or with an additional setting up of a service, to instigate a handover to the base station NB of the first mobile radio station RS1. The same method is also used, for example, with hierarchical network structures, when a connection is handed over between different hierarchy planes, for example, from a micro-cell to a macro-cell, which operate in respectively different frequency bands.

For performing a handover, signal channels SIG.CH1 or SIG.CH2 are used as independent control channels which can be fixedly allocated, as has been described hereinabove in the context of the preferred signaling procedures. In a UMTS system, the set of transport format combinations TFCS (Transport Format Combination Set) is used for signaling a handover. This has many of the transport format combination identifiers TFCI, which are signaled to the subscriber station. If the subscriber station UE is connected to the GSM network RS2 at a first time, then as explained hereinabove, the reduced set of transport format combinations TFCS is used for initiating a handover. After the setting up of a corresponding connection to the first communication system, the complete set of transport format combinations TFCS is used.

According to a modified embodiment, in particular the signaling of the reduced information set can take place over different signaling channels, e.g., over the message control channel BCCH already existing for other control and signaling purposes. The broadcasting of the reduced set of transport format combinations TFCS can thus in particular take place over the radio channel or message channel BCCH. A dedicated transport format combination identifier TFCI is signaled and allocated, e.g., over the signaling channel SIG.CH, to the subscriber station UE, in common with the handover command.

This handover is to be capable of being performed in future radio communication systems, such as for example the UMTS mobile radio system, and also between radio communication systems which support different transmission methods. Further scenarios of the handover between like or different systems and transmission methods are conceivable.

The invention has been described in detail with particular reference to preferred embodiments thereof and examples, but it will be understood that variations and modifications can be effected within the spirit and scope of the invention.

What is claimed is:

1. A method of controlling an intersystem handover between first and second radio communication systems having first and second signaling channels, respectively, comprising:

signaling to a subscriber station a reduced set of transport format combinations related to setting up a connection to the second radio communication system, in one of a dedicated second signaling channel and a radio channel of the second radio communication system;

selecting a transport format indicator from the reduced set of transport format combinations for initiation of a handover to at least one of a first signaling channel and a data channel of the first radio communication system; and signaling a complete set of transport format combinations to the subscriber station in the first signaling channel.

2. A method according to claim 1, further comprising initiating the handover to a signaling and/or data channel of the first radio communication system.

3. A method according to claim 2, further comprising coding the transport format indicator by bitmap coding.

4. A method according to claim 3, wherein the first radio communication system is a UMTS mobile radio system and the second radio communication system is a GSM mobile radio system.

5. A method according to claim 4, wherein the second signaling channel of the second radio communication system is one of a stand-alone dedicated control channel and a radio control channel.

6. A communication system subscriber station for use in an intersystem handover between first and second radio communication systems having first and second signaling channels, respectively, comprising:

a memory to store data of a reduced set of transport format combinations related to setting up a connection to the second radio communication system, in one of a dedicated second signaling channel and a radio channel of the second radio communication system; and a processor, coupled to said memory, to select a transport format indicator from the reduced set of transport format combinations for initiation of a handover to at least one of a first signaling channel and a data channel of the first radio communication system; and to receive a complete set of transport format combinations to the subscriber station via the first signaling channel.

7. A communication system network station for use in an intersystem handover between first and second radio communication systems having first and second signaling channels, respectively, comprising:

a memory to store data of a reduced set of transport format combinations related to setting up a connection to the second radio communication system, in one of a dedicated second signaling channel and a radio channel of the second radio communication system; and a processor, coupled to said memory, to select a transport format indicator from the reduced set of transport format combinations for initiation of a handover to at least one of a first signaling channel and a data channel of the first radio communication system; and to receive a complete set of transport format combinations to the subscriber station via the first signaling channel.

* * * * *